United States Patent [19]

Vian

[11] 4,193,442
[45] Mar. 18, 1980

[54] DUAL BIMETAL RELIEF VALVE

[76] Inventor: David R. Vian, 849 S. Church St., Lodi, Calif. 95240

[21] Appl. No.: 21,747

[22] Filed: Mar. 19, 1979

[51] Int. Cl.² ............................................. G05D 23/08
[52] U.S. Cl. .................................. 165/35; 123/41.33; 123/196 AB; 184/104 B; 236/34.5; 236/93 R; 236/101 C
[58] Field of Search ................ 236/34.5, 93 R, 101 A, 236/101 C, 101 E; 123/41.33, 196 AB, 196 A; 73/363.5; 184/6.22, 104 B; 165/35, 40

[56] References Cited

U.S. PATENT DOCUMENTS

| | | | |
|---|---|---|---|
| 1,821,014 | 9/1931 | Heitger | 73/363.5 X |
| 1,888,225 | 11/1932 | Hetherington | 236/93 R |
| 2,960,606 | 11/1960 | Berger | 73/363.5 X |
| 3,300,135 | 4/1967 | Slater et al. | 236/34.5 |
| 3,353,590 | 11/1967 | Holman | 165/35 |
| 3,463,317 | 8/1969 | Prior | 210/181 |
| 3,506,192 | 4/1970 | Otto | 236/34.5 |
| 3,954,222 | 5/1976 | Bjorklund et al. | 236/101 A X |

Primary Examiner—Albert J. Makay
Assistant Examiner—William E. Tapolcai, Jr.
Attorney, Agent, or Firm—Townsend and Townsend

[57] ABSTRACT

In an adapter unit for use between an external filter element and fluid reservoir are dual thermostatic pressure relief valves. A body member with a curved recess has ports with opposing valve seats communicating with the recess, and a curved leaf member of approximately three-quarters of a full circle is disposed in the recess and is operative as a double valve gate. The leaf member is at least one bimetal strip having a reversal of high expansion and low expansion sides at a preselected point at approximately one-third of its length from an anchor point. Changes in ambient fluid temperature cause a substantially linear displacement between opposing valve seats at the free end of the leaf member.

10 Claims, 5 Drawing Figures

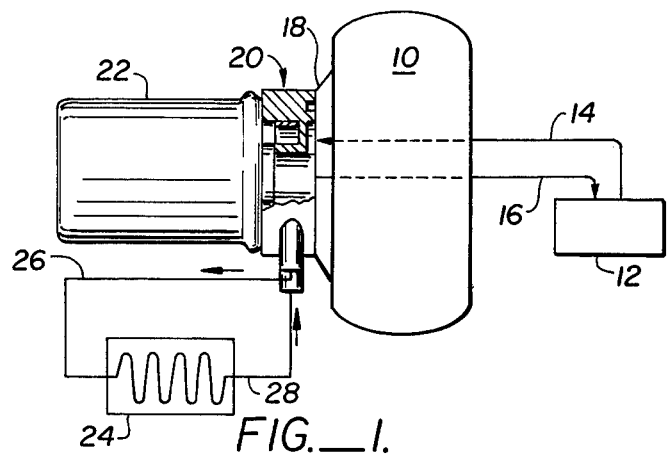
FIG._1.
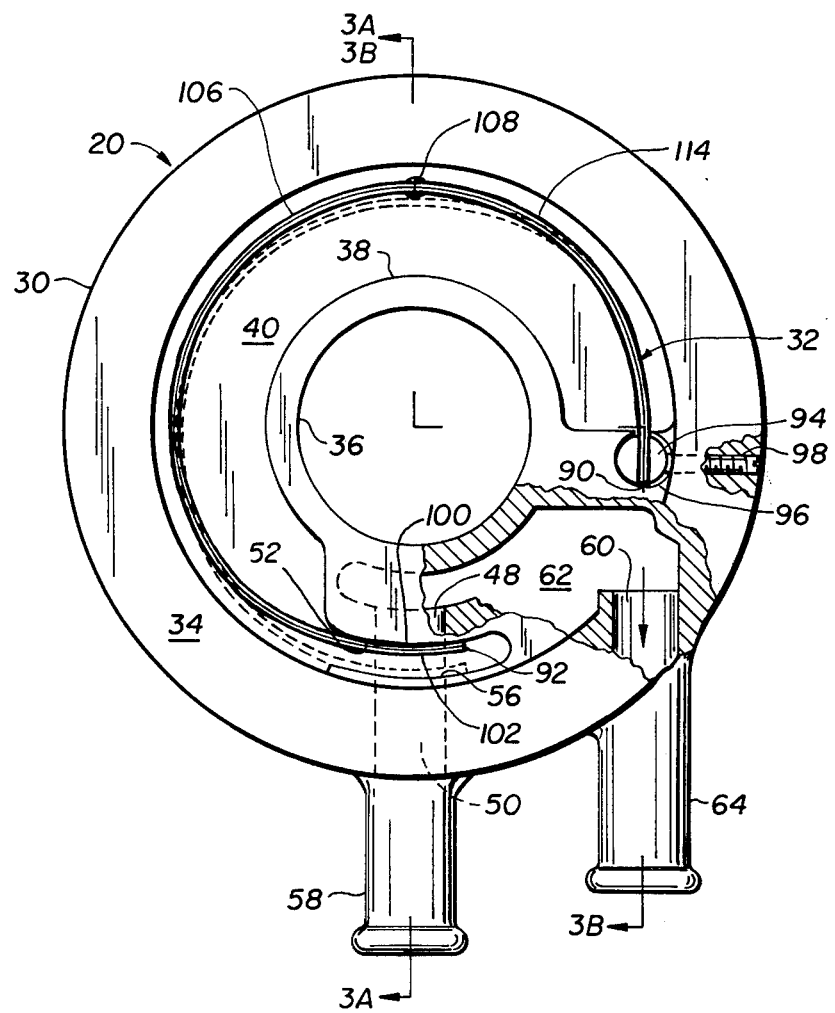
FIG._2.

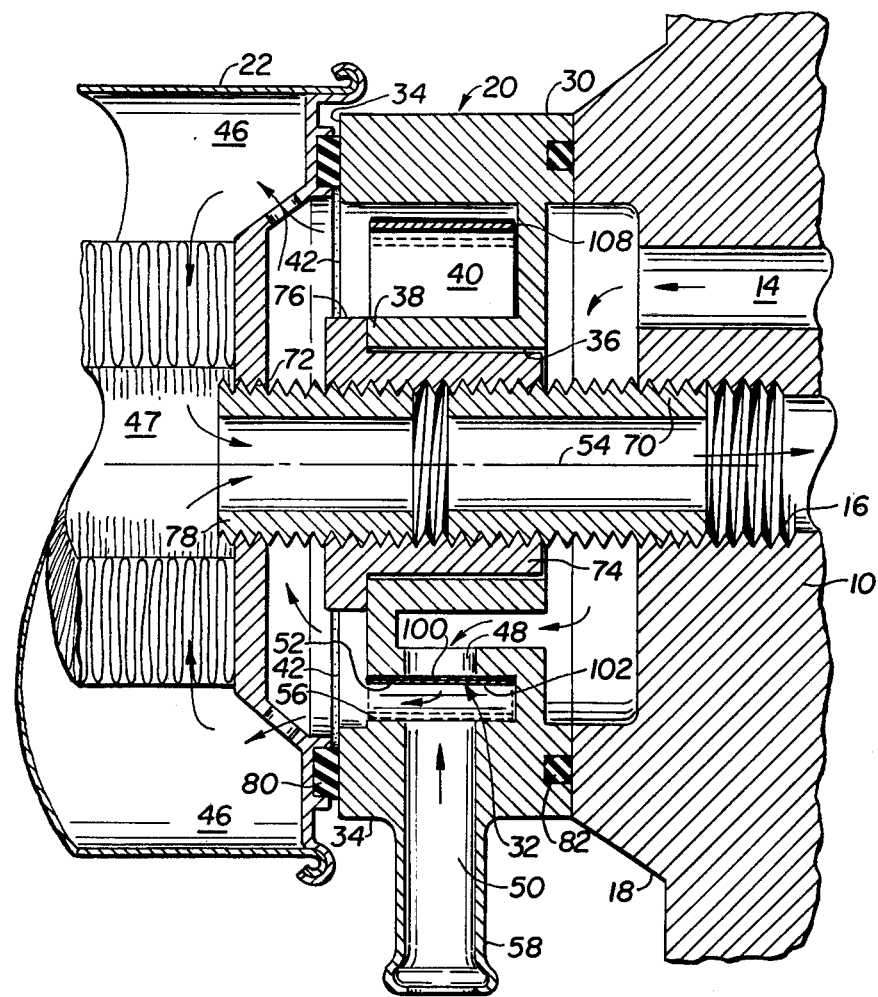
FIG.—3A.

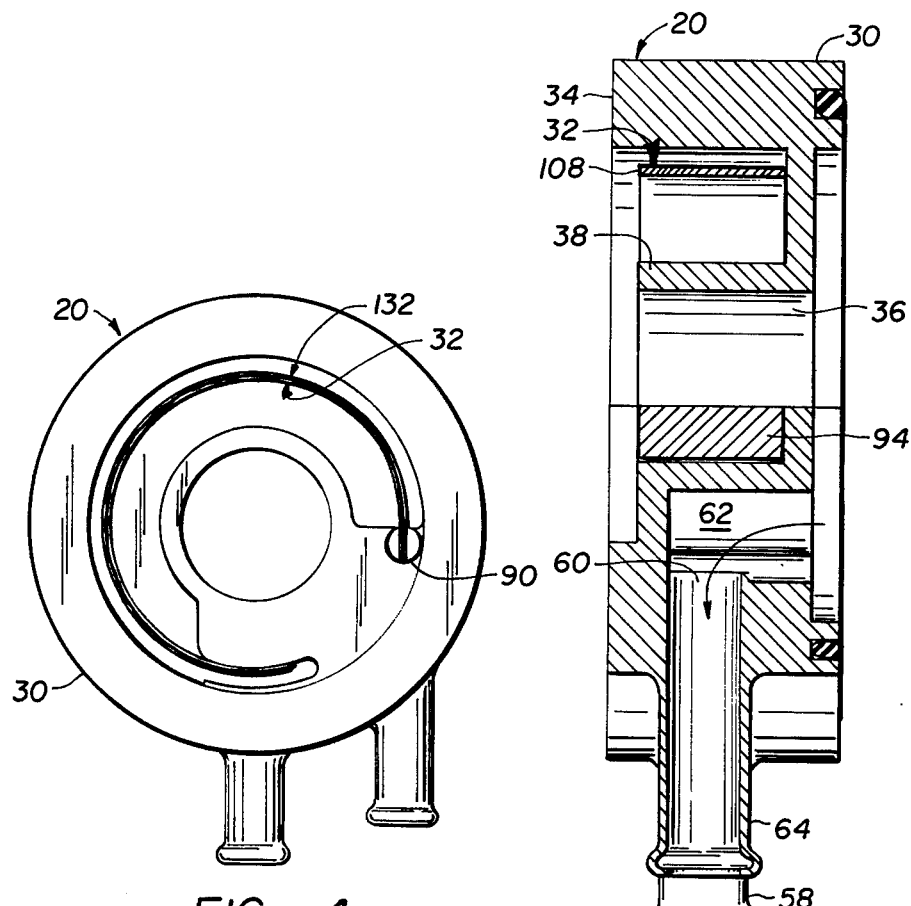
FIG._4.
FIG._3B.

DUAL BIMETAL RELIEF VALVE

BACKGROUND OF THE INVENTION

1. Field of Invention

This invention relates generally to the cooling of lubricating fluids of engines and particularly to an adapter unit incorporating a relief valve for attaching an auxiliary cooling element in a closed lubricating system. In particular, the invention relates to a thermostatic relief valve in an adapter which couples a spin-on type oil filter to an automotive engine in a manner which does not require altering the filter unit.

Automotive engines, particularly engines subject to heavy loading such as recreational vehicles and racing vehicles frequently can benefit from an auxiliary device for cooling the lubricating oil in a closed lubricating system. Otherwise, the lubricating oil can overheat and its lubricating ability can be compromised, thereby resulting in increased engine wear and possible engine failure.

In order to provide a remedy to this problem, auxiliary oil cooling devices have been developed which include an oil cooling radiator coupled to an adapter which is positioned between the oil filter and the engine connection for the oil filter. Although such auxiliary oil coolers are relatively well-known, a particular problem has been the maintenance of the lubricating oil above acceptable minimum temperatures for most efficient engine operation, as well as the provision of pressure relief and fluid bypass in the event of excessive pressure differential within the adapter of the closed fluid circuit system. A valve is therefore needed which can assure a constant supply of fluid within a safe operating temperature and pressure range under the most adverse operating conditions.

2. Description of the Prior Art

Devices for cooling engine lubricating fluids are well-known. Representative disclosures are U.S. Pat. Nos. 2,068,395; 2,348,247; and 3,463,317.

Oil cooler adapters incorporating one-way pressure relief valves are known as for example a unit manufactured by Thermo-Chem Corporation of Tulsa, Oklahoma.

Bimetal strips are well-known expedients for operating thermostatic switches particularly where simple make and break electrical contact is required. Also known are electrical switches having bimetal strips with a 180° reversal of surfaces. See for example U.S. Pat. Nos. 3,656,080 and 2,415,473.

A bimetal element is known for operating a poppet valve in a gas line, as for example U.S. Pat. No. 2,227,901 wherein a reversed bimetal element is used as part of a device for urging a single poppet valve to translate within a valve guide.

SUMMARY OF THE INVENTION

In an adapter unit to be disposed between an external filter unit and a fluid reservoir there are provided dual thermostatic pressure relief valves operated by a single valve gate. The adapter unit comprises a body member having an interior recess with two closely spaced inlet ports, the ports having opposing valve seats. A curved bimetal leaf of approximately three-quarters of a full circle is disposed in the recess and anchored at one end to the body member. The free end of the leaf is operative as a double valve gate for alternately opening and closing the opposing ports. In particular, the leaf is a bimetal element with a reversal of high expansion and low expansion sides at a preselected point at approximately one-third of its length from the anchor point. In a specific embodiment, the first portion of the leaf between the anchor and the preselected point has the low expanding side of the bimetal element radially outwardly disposed relative to the high expanding side, and in the portion between preselected point and the free end, the low expanding side is radially inwardly disposed relative to the high expanding side. A preferred semicircular shape of the bimetal element is such as to cause a substantially linear displacement of the free end between the opposing valve seats with a force sufficient to close off the valves completely and throw sufficient to fully open the valves to minimize excess pressure differential across the ports. Moreover, the leaf is also operative as a pressure relief valve gate in the event of excess forward differential pressure across a closed valve.

In one specific application, the dual valves are incorporated within a relatively thin cylindrical adapter which couples between a spin-on type oil filter unit and its connection in an engine lubricating circuit. The valves are operative to direct flow of lubricating fluid through a cooling radiator whenever the temperature of the fluid exceeds a first predetermined temperature level, and the valves are further operative to cut off flow of lubricating fluid through the cooling radiator whenever the fluid temperature and pressure are below selected levels.

The invention will be more clearly defined in the following description when considered in connection with the accompanying drawings.

BRIEF DESCRIPTION OF THE DRAWINGS

FIG. 1 is a side elevational view in partial cutaway and schematic illustrating an adapter unit coupling an engine fluid reservoir with a filter unit and a lubricating fluid cooling element.

FIG. 2 is an end view in partial cutaway of the adapter unit illustrating the dual valves.

FIG. 3A is a side cross-sectional view along a line 3A—3A of FIG. 2 also illustrating couplings employed with the adapter unit according to the invention.

FIG. 3B is a side cross-sectional view along a line 3B—3B of FIG. 2.

FIG. 4 shows an end view of another embodiment of the invention.

In connection with the accompanying drawings, similar elements are identified by common reference designations.

DETAILED DESCRIPTION OF SPECIFIC EMBODIMENTS

The thermostatic pressure relief valve adapter unit according to the invention is particularly useful in automotive applications and is therefore illustrated in connection with a specific automotive application. In FIG. 1, there is shown an engine casing 10 enclosing a fluid reservoir 12 having feed lines 14 and 16, the feed lines communicating to a mounting collar 18 to which is mounted an adapter unit 20 according to the invention. A filter unit 22 is mounted onto the adapter unit 20 and extends therefrom. The adapter unit 20 is coupled to a lubricating fluid cooling element 24 through feed lines 26 and 28.

Turning to FIG. 2 in connection with FIGS. 3A and 3B, the adapter unit 20 is shown in greater detail. The adapter unit 20 comprises a cylindrical body member 30 and a curvilinear leaf member 32. The body member 30 comprises a first annular collar 34, a circular passage 36 centrally located in relation to the collar 34, a second collar 38 about the passage 36, and a recess 40 between the second collar 38 and the first collar 34. The recess 40 must be open to abut to an outer annular chamber 46 of filter 22. In particular a portion of the recess 40 abutting to the filter 22 comprises an outlet port 42 (FIGS. 3A and 3B) in fluid communication with an outer annulus 46 of the filter element 22. The central passage 36 provides fluid communication between the core portion 47 of the filter element 22 and fluid reservoir outlet feed line 16.

The body member 30 further comprises a first inlet port 48 providing fluid communication between fluid reservoir inlet feed line 14 and recess 40, and a second inlet port 50 providing fluid communication between the cooling element 24 through feed line 28 and the recess 40. The first inlet port 48 opens into recess 40 at a valve seat 52 which is substantially perpendicular to a radius through a central axis 54 (FIG. 3A) of body member 30 and having its face away from the central axis 54. The second inlet port 50 has a valve seat 56 directly opposing the first valve seat having its face toward the central axis 54. A male fitting 58 or like coupling is provided through the external wall of body member 30 for coupling to the feed line 28.

Fluid to be cooled may be directed to the cooling element 24 through feedline 26. In the embodiment shown, an auxiliary port 60 (FIGS. 2 and 3B) is provided in the body member 30 in fluid communication with the feed line 14. A well 62 in the body member 30 is in fluid communication with the feed line 14 and both the first inlet port 48 and the auxiliary port 60. The fluid inlet port 60 is provided with a male coupling 64 which is connected to feed line 26 to the cooling element 24. Alternatively, port 60 can be eliminated where a fluid coupling is provided between the fluid reservoir 12 and the cooling element 24.

A suitable mechanical coupling between the filter 22 and the collar 18 sandwiching the adapter 20 is shown most clearly in FIG. 3A. A first externally threaded nipple 70 is mounted to the engine casing 10 on internal threads of feed line 16. The threaded nipple 70 is normally provided for mounting the filter element 22 to the collar 18 on an internally threaded annulus 72. The passage 36 is not threaded. Instead, a removable bushing 74 is provided for attaching the body member 20 to the nipple 70. The bushing 74 has an unthreaded external circumference mating with the internal circumference of the passage 36, and a hex collar 76 of relatively narrow thickness for abutting to the shoulder of the second collar 38. The bushing 74 is further provided with internal threads mating with the external threads of nipple 70. A second externally threaded nipple 78 is mounted to the internal threads of bushing 74 and extends therefrom. The filter element 22 is mounted to the nipple 78 on the threaded annulus 72. A filter gasket 80 seals the filter element 22 to the first collar 34 in the same manner as the filter gasket 80 would seal with the collar 18. An O-ring filter gasket 82 on the side of the collar 34 abutting to the collar 18 seals the adapter unit 20 to the collar 18.

Each type of application may require a specially adapted bushing 74, that is a bushing which is internally threaded to match with the external threads of the mounting nipple 70. The bushing 74 is therefore only illustrative of one mounting technique.

The adapter unit 20 according to the invention serves three functions. First, the adapter unit 20 is a fluid flow diverter for directing lubricating fluid through an external cooling element. Second, the adapter unit 20 has pressure relief valving capabilities. And third, the adapter unit 20 has thermostatic, or temperature-sensitive, valving capabilities. The leaf member 32 (FIG. 2) is a valve gate in the adapter unit 20. In particular, the leaf member 32 is a dual valve gate which is operative as a pressure relief valve gate and more particularly, the leaf member 32 is operative as a combination thermostatic and pressure relief valve gate.

The leaf member 32 comprises at least one curvilinear strip of resilient metallic material suitable for immersion in liquid lubricating fluid and is characterized by an obverse face, a reverse face and thin edges. The leaf member 32 is intended to flex only in the plane perpendicular to the faces. Preferably, the leaf member 32 is a semicircular strip extending substantially along one plane perpendicular to its faces about an arc of approximately three-quarters of a circle. The leaf member 32 has an anchor end 90 and a free end 92. A slug 94 may be swaged onto the anchor end 90 to hold it in place. The leaf member 32 is mounted in the recess 40 with the slug 94 of the anchor end 90 in a bore 96 which is displaced from the central axis 54 (FIG. 3A) and also from a center of radius of the arc of the leaf member 32. Thus with the leaf member 32 mounted in place, the center of the arc of the leaf member 32 is roughly along central axis 54 at the body member 30. A set screw 98 is provided through the collar 34 to hold the slug 94 in place in bore 96.

At its free end 92, the leaf member 32 has a first obverse face defining a first valve gate 100 and a second reverse face defining a second valve gate 102, both of which are approximately perpendicular to the radius of the arc of the leaf member 32. The obverse face valve gate 100 and reverse face valve gate 102 are at a region approximately three-quarters of a circle circumferentially displaced from the anchor end 90. The obverse face valve gate 100 is radially inwardly facing opposing first valve seat 52, and the reverse face valve gate 102 opposes second valve seat 56. The free end 92 alternately abuts to the first valve seat 52 and to the second valve seat 56 upon displacement of the free end 92. The "throw", or spacing between the first and second valve seats 52, 56 and the cross-sectional area of the first port 48 and second port 50 are selected to assure minimal pressure drop in fluid flowing through the respective ports 48, 50. Moreover, the force of the leaf member 32 is selected to assure that the closed valve does not open unless the pressure differential across the port exceeds a preselected level in the ambient temperature range of the lubricating fluid for which the valves are intended to be closed.

The leaf member 32 is preferably temperature-sensitive to fluid immersing it, so that the first valve gate 100 is biased to abut to the first valve seat 52 at fluid temperatures above a first threshold level and the second valve gate 102 is baised to abut to the second valve seat 56 at fluid temperatures below a second threshold level. For this purpose, the leaf member 32 preferably comprises a thermostatic bimetal strip having a first longitudinal portion 104 and a second longitudinal portion 106, the first portion extending from the anchor end 90 to a transition point 108 approximately one-quarter of a circle circumferentially displaced from the anchor end 90, and the second portion 106 extending between the transition point 108 and the free end 92 circumferentially displaced approximately one-half of a circle from the transition point 108. The bimetal strip has a high expanding side and a low expanding side. The high expanding side is reversed relative to the low expanding side at the transition point 108. The low expanding side of the first portion 104 is radially outwardly disposed relative to the high expanding side, and the low expanding side of the second portion 106 is radially inwardly disposed relative to the high expanding side.

A suitable bimetal is a Texas Instruments thermostatic material Type BP1, manufactured by Texas Instruments Company of Attleboro, Massachusetts. The bimetal strip has a thick width of about 1.5 cm (0.625 inches) and a thin width of about 0.5 cm (0.020 inches). A reverse weld or twist in the bimetal strip is provided at the transition point 108, and the recess 40 of the body member 30 is sufficiently large at the transition point 108 to assure free clearance for movement along a plane substantially perpendicular to the central axis 54. The bimetal Type BP1 is selected for its relatively high deflection (0.12 mm/degree C. or 0.0027 inch/degree F.) and high deflection force (18.4 gm/0.01 mm or 0.253 oz/0.001 inch), as well as its resistance to corrosion. The bimetal strip is preformed to a nominal radius so that a low transition temperature of 170° F., the second gate 102 abuts to valve seat 56, and at a high transition temperature of 210° F., the first gate 100 abuts to valve seat 52. At temperatures between the transition temperatures, both first and second valve ports 48, 50 are partially open to the recess 40.

To increase the force of operation of the valve gates, a second leaf member 132 (FIG. 4) is juxtaposed to the first leaf member 32 and anchored at the anchor end 90. The second leaf member 132 is substantially identical in shape and composition to the first leaf member 32. In this manner, the valve gate force is substantially increased, thereby changing the differential pressure required to open and close the ports.

The invention operates substantially as follows: Fluid, typically lubricating oil, initially at a temperature below 170° initially enters port 48 and port 60 from the feed line 14. If the temperature of the fluid is below the lower threshold temperature the port 50 is closed, and port 48 is open into the recess 40 and thence to the filter annulus 46. Fluid flows freely through the adapter 20 into the filter 22 through its filter media into core 47 and back through the nipples 78 and 70 in passage 40 into line 16 to the fluid reservoir 12.

As the fluid is heated, the bimetal of the leaf member 32 senses and responds. In particular, the free end 92 of the leaf member 32 begins to release its force, and the force of the reverse face valve gate 102 against the second valve seat 56 decreases. Below the threshold temperature associated therewith, the second port 50 will not open unless there is blockage in the first port 48, since the fluid pressure in port 48 should always exceed the fluid pressure in port 50. Above the low threshold temperature, however, the free end 92 commences to displace from the second valve seat 56 toward the first valve seat 52. The displacement is substantially linear between the second valve seat 56 and the first seat 52, that is, the obverse face valve gate 100 and reverse face valve gate 102 do not warp, twist, slide or displace circumferentially along the arc of the leaf member 32.

As the second port 50 opens, fluid from the cooling element 24 is introduced through port 50 into the recess 40 and thence into the filter element 22.

If the cooling element 24 causes the ambient temperature of the mixed fluid through port 50 and through port 48 to drop below the lower threshold temperature, the leaf member senses and responds by closing off the first port 50. If however the fluid exceeds the high threshold temperature, the first port 48 is closed and all fluid is directed first into the cooling element 24 and then through the port 50 into the recess 40, thereby to provide maximum cooling for the fluid. Notwithstanding, if the pressure drop in the cooling element 24 is severe, as for example might be caused by a constriction or blockage, the pressure relief function of the leaf member 32 comes into play. The leaf member 32 senses the pressure differential between port 48 and the recess 40, opening to allow fluid flow from the port 48 into recess 40 in the event the pressure differential exceeds the capacity of the leaf member 32 to resist.

The fluid cooling adapter according to the invention has numerous advantages. The adapter provides fluid flow diversion for use in combination with a cooling element in a fluid system having a reservoir and a filter element. The adapter also includes a dual valve gate operative both as a pressure relief valve gate and more particularly as a combination thermostatic and pressure relief valve gate with applications particularly in retrofitted oil cooling systems of small gasoline engines, automobiles and other vehicles.

The invention has now been explained with reference to specific embodiments. While the above provides a full and complete disclosure of the preferred embodiments of the invention, various modifications, alternate constructions and equivalents may be employed without departing from the true spirit and scope of the invention. Therefore the above description and illustrations should not be construed as limiting the scope of the invention, except as indicated by the appended claims.

What is claimed is:

1. In combination with a fluid cooling element and a barrel-type fluid filter in a closed circuit system having a fluid reservoir, an apparatus for connecting said fluid reservoir with said filter and said cooling element, said apparatus comprising:
   a body member and a curvilinear leaf member comprising a strip of resilient material having an obverse face and a reverse face, said body member comprising:
   (a) a first outlet port;
   (b) a recess formed in said body member in fluid communication with said first outlet port;
   (c) a first inlet port having a first valve seat in fluid communication with said recess; and
   (d) a second inlet port having a second valve seat in fluid communication with said recess, said second valve seat being disposed to face said first valve seat on opposing sides of said recess;
   said leaf member extending substantially along one plane perpendicular to its faces about an arc of approximately three-quarters of a circle within said recess and having an anchor to said body member at a first end, said obverse face and said reverse face approximately perpendicular to a radius of said arc at a region approximately three-quarters of a circle circumferentially displaced from said anchor, said obverse face and said reverse face defining opposing first and second valve gates, said first valve gate being disposed to abut to said first valve seat and said second valve gate being disposed to abut to said second valve seat upon displacement of said first valve gate away from said first valve seat.

2. An apparatus as claimed in claim 1 wherein said leaf member is temperature-sensitive to fluid immersing said leaf member, such that said first valve gate is biased to abut to said first valve seat at ambient fluid temperatures above a first threshold level and said second valve gate is biased to abut to said second valve seat at ambient fluid temperatures below a second threshold level.

3. An apparatus as claimed in claim 2 wherein said leaf member comprises a thermostatic bimetal strip having first and second longitudinal portions, said first portion extending from said anchor to a transition point approximately one-quarter of a circle circumferentially displaced from said anchor, and said second portion extending between said transition point and said gate region circumferentially displaced approximately one-half of a circle from said transition point, the high expansion side and the low expansion side of said bimetal being reversed at said transition point.

4. An apparatus as claimed in claim 3 wherein said low expanding side of said first portion of said leaf member is radially outwardly disposed relative to said high expanding side of said first portion, and wherein said low expanding side of said second portion is radially inwardly disposed relative to said high expanding side of said second portion, said first inlet port being in fluid communication with said fluid reservoir and said second inlet port being in fluid communication with said cooling element.

5. An apparatus as claimed in claim 4 further comprising a second leaf member of bimetal materials substantially identical to said first curvilinear leaf member, said second leaf member being juxtaposed to said first leaf member and anchored at said anchor point.

6. in combination with a fluid cooling element and a barrel-type fluid filter in a closed circuit system having a fluid reservoir, an apparatus for connecting said fluid reservoir with said filter and said cooling element, said apparatus comprising:
a body member for sealably coupling said filter to said fluid reservoir; and a curvilinear leaf member comprising a strip of resilient material having an obverse face and a reverse face; said body member comprising:
(a) means defining passage centrally located therein between said filter element and said fluid reservoir;
(b) an outlet port coupled to said filter for directing fluid from said body member to said filter;
(c) a recess formed in said body member about said central passage in fluid communication in said outlet port;
(d) a first inlet port having a first valve seat in fluid communication with said recess; and
(e) a second inlet port having a second valve seat in fluid communication with said recess, said second valve seat being disposed to face said first valve seat on opposing sides of said recess;
said leaf member comprising means extending substantially along one plane perpendicular to its faces about an arc of approximately three-quarters of a circle within said recess and having an anchor to said body member at a first end displaced from a center of radius of said arc, said leaf member having said obverse face and said reverse face approximately normal to a radius of said arc at a region approximately three-quarters of a circle radially displaced from said anchor, said obverse face and said reverse face defining opposing first and second valve gates, said first valve gate being disposed to abut to said first valve seat and said second valve gate being disposed to abut to said second valve seat upon displacement of said first gate away from said first valve seat.

7. The apparatus as claimed in claim 6 wherein said leaf member is temperature-sensitive to fluid immersing said leaf member such that said first valve gate is biased to abut to said first valve seat at ambient fluid temperatures below a first threshold level and said second valve gate is biased to abut to said second valve seat at ambient fluid temperatures above a second threshold level.

8. An apparatus as claimed in claim 7 wherein said leaf member comprises a thermostatic bimetal strip having first and second longitudinal portions, said first portion extending from said anchor to a transition point approximately one-quarter of a circle radially displaced from said anchor and said second portion extending between said transition point and said gate region displaced approximately one-half of a circle from said transition point, the high and low expanding sides of said bimetal being reversed at said transition point.

9. An apparatus as claimed in claim 8 wherein said low expanding side of said first portion of said leaf member is radially outwardly disposed relative to said high expanding side of said first portion, and wherein said low expanding side of said second portion is radially inwardly disposed relative to said high expanding side of said second portion, and wherein said first valve seat of said body member is radially inwardly disposed relative to said second valve seat, said first inlet port being in fluid communication with said fluid reservoir and said second inlet port being in fluid communication with said cooling element.

10. An apparatus as claimed in claim 9 further comprising a second curvilinear leaf member of bimetal materials substantially identical to said first curvilinear leaf member, said second leaf member being juxtaposed to said first leaf member and anchored at said anchor point.